US009960926B2

(12) United States Patent
Oyman

(10) Patent No.: US 9,960,926 B2
(45) Date of Patent: May 1, 2018

(54) METHODS FOR SWITCHING BETWEEN A MBMS DOWNLOAD AND AN HTPP-BASED DELIVERY OF DASH FORMATTED CONTENT OVER AN IMS NETWORK

(71) Applicant: Intel Corporation, Santa Clara, CA (US)

(72) Inventor: Ozgur Oyman, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 0 days. days.

(21) Appl. No.: 14/581,747

(22) Filed: Dec. 23, 2014

(65) Prior Publication Data
US 2015/0131657 A1   May 14, 2015

Related U.S. Application Data

(63) Continuation of application No. 13/994,118, filed as application No. PCT/US2011/065586 on Dec. 16, 2011.

(Continued)

(51) Int. Cl.
*H04L 12/18*   (2006.01)
*H04W 56/00*   (2009.01)
(Continued)

(52) U.S. Cl.
CPC .......... *H04L 12/189* (2013.01); *H04L 5/0037* (2013.01); *H04L 12/18* (2013.01);
(Continued)

(58) Field of Classification Search
CPC ............. H04L 65/1016; H04L 65/1006; H04L 65/4076; H04L 12/189; H04L 65/1083;
(Continued)

(56) References Cited

U.S. PATENT DOCUMENTS

2008/0307041 A1   12/2008 Bouazizi et al.
2009/0219848 A1    9/2009 Lohmar et al.
(Continued)

FOREIGN PATENT DOCUMENTS

| CN | 101582730 A | 11/2009 |
|---|---|---|
| WO | WO 2010114475 A2 | 10/2010 |
| WO | WO 2013/022470 A1 | 2/2013 |

OTHER PUBLICATIONS

3GPP TS 26.237 version 9.3.0, "IP Multimedia Subsystem (IMS) based Packet Switch Streaming (PSS) and Multimedia Broadcast/Multicast Service (MBMS) User Service", Jun. 2010.*

(Continued)

*Primary Examiner* — Oussama Roudani
(74) *Attorney, Agent, or Firm* — Thorpe North & Western

(57) ABSTRACT

A user equipment (UE) operable to switch between a packet-switched streaming service (PSS) download session and a multimedia broadcast multicast services (MBMS) download session. The UE can send a session initiation protocol (SIP) re-invitation to a service control function (SCF) module during the PSS download session, wherein the SCF module is configured to send a SIP BYE message to a hypertext transfer protocol (HTTP)/SIP adapter in order to terminate the PSS download session at the UE. The UE can receive a SIP acknowledgement from the SCF module, wherein the SCF module is configured to receive the SIP acknowledgement from the HTTP/SIP adapter indicating that an HTTP server has terminated the PSS download session for the UE. The UE can switch from the PSS download session to the MBMS download session at the UE in response to the SIP acknowledgement being received at the UE.

16 Claims, 8 Drawing Sheets

Related U.S. Application Data

(60) Provisional application No. 61/522,623, filed on Aug. 11, 2011.

(51) Int. Cl.

| | |
|---|---|
| *H04W 4/06* | (2009.01) |
| *H04L 29/08* | (2006.01) |
| *H04L 5/00* | (2006.01) |
| *H04N 21/845* | (2011.01) |
| *H04N 21/2343* | (2011.01) |
| *H04N 21/61* | (2011.01) |
| *H04N 21/647* | (2011.01) |
| *H04L 29/06* | (2006.01) |
| *H04W 4/00* | (2018.01) |
| *H04W 4/08* | (2009.01) |
| *H04W 72/00* | (2009.01) |
| *H04W 76/00* | (2018.01) |
| *H04W 84/04* | (2009.01) |

(52) U.S. Cl.
CPC ........ *H04L 12/1863* (2013.01); *H04L 65/105* (2013.01); *H04L 65/1006* (2013.01); *H04L 65/1016* (2013.01); *H04L 65/1069* (2013.01); *H04L 65/80* (2013.01); *H04L 67/02* (2013.01); *H04N 21/23439* (2013.01); *H04N 21/6131* (2013.01); *H04N 21/64707* (2013.01); *H04N 21/8456* (2013.01); *H04W 4/005* (2013.01); *H04W 4/06* (2013.01); *H04W 4/08* (2013.01); *H04W 56/00* (2013.01); *H04W 72/005* (2013.01); *H04W 76/002* (2013.01); *H04W 84/042* (2013.01)

(58) Field of Classification Search
CPC .. H04L 65/4084; H04L 65/105; H04W 76/02; H04W 76/002; H04W 48/18
See application file for complete search history.

(56) References Cited

U.S. PATENT DOCUMENTS

| | | | | |
|---|---|---|---|---|
| 2009/0316615 | A1* | 12/2009 | Vedantham | H04W 36/02 370/312 |
| 2012/0110120 | A1 | 5/2012 | Willig | |
| 2012/0259994 | A1* | 10/2012 | Gillies | H04L 12/1881 709/231 |
| 2013/0036234 | A1* | 2/2013 | Pazos | H04L 12/189 709/231 |
| 2013/0111028 | A1 | 5/2013 | Kondrad | |
| 2013/0212166 | A1 | 8/2013 | Willig | |

OTHER PUBLICATIONS

TS 26.237 V.10.2.0, IMS based PSS and MBMS User Service, Jun. 2011.*
TS 26.247 V10.0.0, Streaming Service (PSS); Progressive Download and Dynamic Adaptive Streaming over HTTP (3GP-DASH), (Jun. 2011).*
PCT application PCT/US2011/065586; filing date Dec. 16, 2011; Intel Corporation et al.; International Search Report dated Jul. 30, 2012.
3GPP; 3$^{rd}$ Generation Partnership Project; Technical Specification Group Services and System Aspects; Policy and charging control architecture; 3GPP TS 23.203 v7.11.0; Jun. 2009; 75 pages; Release 7.
3GPP; 3$^{rd}$ Generation Partnership Project; Technical Specification Group Services and System Aspects; IP Multimedia Subsystem (IMS); Stage 2; 3GPP TS 23.228 v11.0.0; Mar. 2011; 271 pages; Release 11.
3GPP; 3$^{RD}$ Generation Partnership Project; Technical Specification Group Services and Systemk Aspects; IP Multimedia Subsystem (IMS) based Packet Switch Streaming (PSS) and Multimedia Broadcast/Multicast Service (MBMS) User Service; Protocols; 3GPP TS 26.237 v 10.2.0; Jun. 2011; 138 pages; Release 10.
3GPP; 3$^{rd}$ Generation Partnership Project; Technical Specification Group Services and System Aspects; Transparent end-to-end Packet-switched Streaming Service (PSS); Progressive Download and Dynamic Adaptive Streaming over HTTP (3GP-DASH); 3GPP TS 26.247 V10.0.0; Jun. 2011; 94 pages; Release 10.
3GPP; 3$^{rd}$ Generation Partnership Project; Technical Specification Group Services and System Aspects; Multimedia Broadcast/Multicast Service (MBMS); Protocols and codecs; 3GPP TS 26.346 v10.0.0; Mar. 2011; 150 pages; Release 10.
Chen et al; Response to the CfP on HTTP Streaming: Adaptive Video Streaming based on AVC; ISO/IEC JTC1/SC29/WG11, MPEG2010/M17909; MPEG Meeting; Jul. 26-Jul. 30, 2010; 20 pages; Geneva, Switzerland.
Interdigital Communications; IMS-based PSS and MBMS Enhancement to Support Cross-Device Synchronization; 3GPP TSG-SA4 #64; S4-110397; Apr. 11-15, 2011; 4 pages; Agenda item 7; San Diego, California.
OIPF—Open IPTV Forum; Release 2 Specification; HTTP Adaptive Streaming; Sep. 7, 2010; 25 pages; V2.0; Open IPTV Forum.
Qualcomm Incorporated; Initialisation Segment incorporation in DASH over MBMS; 3GPP TSG-SA4 Meeting #65, S4-110622; Aug. 15-19, 2011; 5 pages; Kista, Sweden.
Stockhammer et al.; Text of ISO/IES 23001-6: Dynamic adaptive streaming over HTTP (DASH); Information technology—MPEG systems technologies—Part: Dynamic adaptive streaming over HTTP (DASH); MPEG-B Systems; Oct. 15, 2010; 62 pages; International Organization for Standardization.
Telefon AB LM Ericsson et al, "HTTP (file) Streaming and MBMS", 3GPPSA4 Tdoc S4-100081, discussion and approval, Jan. 2010, Meeting 57, Agenda 6, 4 pages, St. Julian, Malta.
3GPP; 3$^{rd}$ Generation Partnership Project; Technical Specification Group Servics and Systems Aspects; IP Multimedia Subsystem (IMS) based Packet Switch Streaming (PSS) and Multimedia Broadcast Service (MBMS) User Service; Protocols; 3GPP TS 26.237 v9.3.0; Jun. 2010; 99 pages; Release 9.
ETSI TS 126 237, "Universal Mobile Telecommunications System {UMTS); LTE• IP Multimedia Subsystem {IMS) based Packet Switch Streaming {PSS) and Multimedia Broadcast/Multicast Service {MBMS) User Service; Protocols", Jun. 2011, V 10.2.0, Release 10, 44 pages.

* cited by examiner

METHODS FOR SWITCHING BETWEEN A MBMS DOWNLOAD AND AN HTPP-BASED DELIVERY OF DASH FORMATTED CONTENT OVER AN IMS NETWORK

RELATED APPLICATIONS

This application is a continuation of U.S. patent application Ser. No. 13/994,118 filed on Jun. 13, 2013, which is a U.S. nationalization under 35 USC § 371 of PCT/US 11/65586, filed on Dec. 16, 2011, which claims the benefit under 35 U.S.C. § 119(e) of a U.S. Provisional application filed on Aug. 11, 2011 in the U.S. Patent and Trademark Office and assigned Ser. No. 61/522,623, all of which are hereby incorporated by reference in their entirety.

BACKGROUND

Wireless mobile communication technology uses various standards and protocols to transmit data between a transmission station and a wireless mobile device. Some wireless devices communicate using orthogonal frequency-division multiplexing (OFDM) combined with a desired digital modulation scheme via a physical layer. Standards and protocols that use OFDM include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the transmission station can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless mobile device, known as a user equipment (UE). A downlink (DL) transmission can be a communication from the transmission station (or eNodeB) to the wireless mobile device (or UE), and an uplink (UL) transmission can be a communication from the wireless mobile device to the transmission station.

In a downlink transmission, the transmission station can communicate with a single wireless mobile device with a unicast subframe using a unicast service. A unicast delivery can have a one-to-one relationship, referring to one message to one mobile device. Alternatively, the transmission station can communicate with a plurality of wireless mobile devices with a multicast\broadcast single-frequency network (MBSFN) subframe using a multimedia broadcast multicast service (MBMS). The transport multicast and broadcast traffic in a MBMS can have a one-to-many relationship, referring to one message to many mobile devices.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
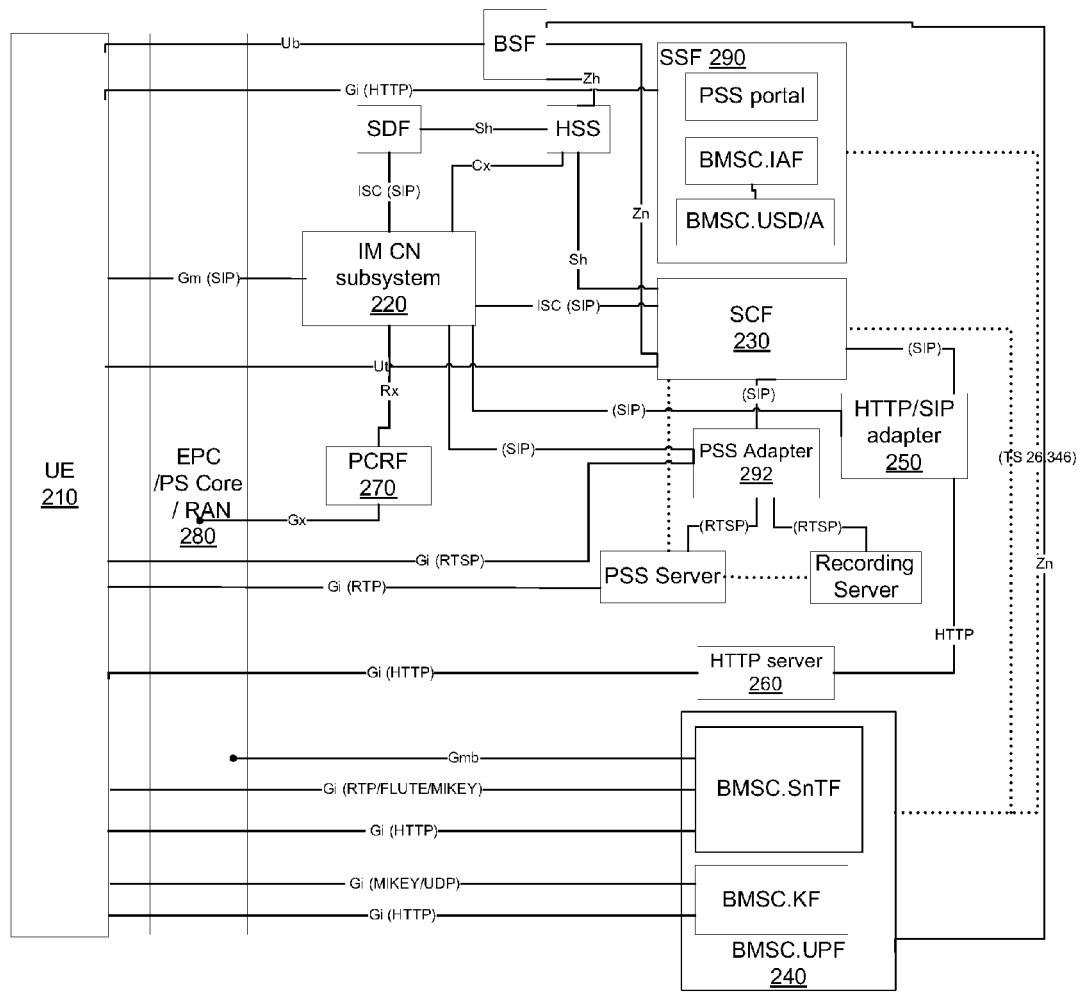
FIG. 1 illustrates a block diagram of an internet protocol (IP) multimedia subsystem (IMS) based packet switch streaming (PSS) and multimedia broadcast multicast services (MBMS) functional architecture in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Hypertext transfer protocol (HTTP) streaming can be used as a form of multimedia delivery of Internet video. HTTP-based delivery can provide reliability and deployment simplicity due to a broad adoption of both HTTP and HTTP's underlying protocols, including transmission control protocol (TCP)/internet protocol (IP). HTTP-based delivery can enable easy and effortless streaming services by avoiding network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side.

Dynamic adaptive streaming over HTTP (DASH) is a multimedia streaming technology where a multimedia file can be partitioned into one or more segments and delivered to a client using HTTP. A DASH client can receive multimedia content by downloading the segments through a series of HTTP request-response transactions. DASH can provide the ability to dynamically switch between different bit rate representations of the media content as the available bandwidth changes. Thus, DASH can allow for fast adaptation to changing network and wireless link conditions, user preferences and device capabilities, such as display resolution, the type of central processing unit (CPU) employed, or memory resources available. The dynamic adaptation of DASH can provide a better quality of experience (QoE) for a user, with shorter startup delays and fewer rebuffering events.

The internet protocol (IP) multimedia subsystem or IP multimedia core network subsystem (IMS) is an architectural framework in 3GPP for delivering IP multimedia services. The IP multimedia core network subsystem can be a collection of different core network and access network functions, linked by standardized interfaces, which grouped together can form one IMS administrative network. To ease the integration with the Internet, IMS can use session initiation protocol (SIP). Several roles of SIP servers or proxies, which can collectively be called a call session control function (CSCF), can be used to process SIP signalling packets in the IMS. Fixed access (e.g., digital subscriber line (DSL), cable modems, or Ethernet), mobile access (e.g., W-CDMA, CDMA2000, GSM, or GPRS) and wireless access (e.g., WLAN or WiMax) can be supported by the IMS. Other phone systems like plain old telephone (POTS—analog telephones) and non IMS-compatible Voice over IP (VoIP) systems can be supported through gateways.

DASH-formatted content can be delivered over an IMS network in a multicast frame, such as a multimedia broadcast multicast services (MBMS) download delivery, or in a unicast frame, such as an HTTP-based delivery. A content delivery session including DASH content can be delivered using a MBMS download method, then switched to an HTTP-based delivery method in the middle of the session (mid session). Alternatively, the content delivery session can be delivered using the HTTP-based delivery method, then switched to the MBMS download method mid session. Switching in an IMS-based network between the MBMS download method and HTTP-based delivery method during the transmission of DASH-formatted content to the user can be desirable.

As illustrated in the example block diagram of FIG. 1, in the switch from the MBMS download to the HTTP-based delivery of DASH formatted content in the IMS network, a mobile device, such as a user equipment (UE) 210, can send a session initiation protocol (SIP) re-invitation to a service control function (SCF) 230 module while the mobile device is receiving a MBMS download in a current content delivery session including DASH content. The SIP re-invitation can include a SIP Re-INVITE message. The SIP re-invitation can include a request uniform resource identifier (URI) for an HTTP server 260 to provide DASH content via the HTTP-based delivery in the same content delivery session. The request URI can include a domain name or a content identifier identifying (or referencing) an HTTP server to provide the HTTP-based delivery. The SCF module can be included in an internet protocol (IP) multimedia subsystem (IMS). After receiving the SIP re-invitation via an IP multimedia core network (IM CN) subsystem 220, the SCF module can send a SIP invitation to an HTTP/SIP adapter 250 to select an HTTP server 260 for the HTTP-based delivery. The SIP invitation can include a SIP INVITE message with the request URI, where the SCF module previously used a domain name or a content identifier associated with (or referencing) a broadcast multicast service center (BMSC) or BMSC user plane sub-functions (UPF) (BMSC.UPF) 240 to establish the MBMS download of the DASH formatted content via the BMSC.

The domain name and the content identifier referencing the HTTP server can differ from the domain name and the content identifier associated with the BMSC. The SCF module 230 can also send a termination request to the BMSC to terminate the MBMS download for the content delivery session. The HTTP/SIP adapter can setup the HTTP server for the HTTP-based delivery of the DASH formatted content for the same content delivery session previously used for the MBMS download. The HTTP/SIP adapter can send a SIP acknowledgement to the SCF module indicating a selection of the HTTP server for the content delivery session. The SIP acknowledgement can include a SIP 200 OK message. The SCF module can forward the SIP acknowledgement to the mobile device via the IM CN subsystem indicating a switch to the HTTP server for the content delivery session. The mobile device can then receive the DASH formatted content of the content delivery session via the HTTP-based delivery instead of the MBMS download.

In the switch from the HTTP-based delivery to the MBMS download of DASH formatted content, the mobile device can send a SIP re-invitation to the SCF 230 module while the mobile device is receiving an HTTP-based delivery of DASH formatted content in a content delivery session. The SIP re-invitation can include a request URI for the BMSC or the BMSC.UPF 240 to provide DASH formatted content via the MBMS download in the same content delivery session. The request URI can include a domain name or a content identifier identifying (or referencing) an the BMSC to provide the MBMS download. After receiving the SIP re-invitation via the IM CN subsystem 220, the SCF module can send an invitation message to the BMSC or the BMSC.UPF to initialize (or setup) the BMSC for the MBMS download of the content delivery session. The invitation message can include a request URI, where the SCF module previously used a domain name or a content identifier associated with (or referencing) the HTTP server 260 to establish the HTTP-based delivery of the DASH formatted content via the HTTP server. The domain name and the content identifier referencing the HTTP server can differ from the domain name and the content identifier associated with the BMSC. The SCF module can receive a BMSC acknowledgement from the BMSC indicating a selection of the BMSC for the content delivery session after the BMSC is setup for the MBMS download. The SCF module can send a SIP termination request to the HTTP/SIP adapter 250 to release the HTTP server and/or to terminate the HTTP-based delivery for the content delivery session. The SIP termination request can include a SIP BYE message.

The HTTP/SIP adapter can send a SIP acknowledgement to the SCF module 230 indicating a termination of the HTTP-based delivery for the content delivery session and/or a setup of the BMSC for the content delivery session. The SIP acknowledgement can include a SIP 200 OK message. The SCF module can forward the SIP acknowledgement to the mobile device via the IM CN subsystem indicating a switch to the BMSC for the content delivery session. The mobile device can receive the DASH formatted content of the content delivery session via the MBMS download instead of the HTTP-based delivery.

The following provides additional details of the examples. MBMS download delivery can be an alternative service for offloading HTTP-based unicast download delivery. Benefits of using a MBMS download delivery can include enabling support for non-real-time service types, enabling the provision of contents that complement MBMS streaming services, and leveraging the increasing storage capacity on mobile devices. The DASH segment format, although mainly intended for unicast transport with HTTP, can be agnostic of the delivery environment being unicast or multicast. DASH-formatted content can be transmitted using MBMS download delivery with a file delivery over unidirectional transport (FLUTE) protocol.

FLUTE can be a protocol for the unidirectional delivery of files over the Internet, which can be particularly suited to multicast networks. FLUTE can build on asynchronous layered coding (ALC), a base protocol designed for massively scalable multicast distribution. FLUTE can provide instantiation of a layered coding transport (LCT) building block. The ALC protocol can combine the LCT building block, a congestion control (CC) building block and a forward error correction (FEC) building block to provide congestion controlled reliable asynchronous delivery. The LCT can provide transport level support for reliable content delivery and stream delivery protocols. Streaming data or downloads can be encapsulated in real-time transport protocol (RTP) and transported using the FLUTE protocol when delivering over MBMS bearers. RTP can be used in communication and entertainment systems that involve streaming media, such as telephony, video teleconference applications, television services and web-based push-to-talk features.

Three functional layers can be used for the delivery of MBMS-based services, which can include a bearers layer, a delivery method layer, and a user service layer or application layer. The bearers layer can provide a mechanism by which IP data can be transported. Bearers can include a unicast bearer or a MBMS bearer. The delivery layer can provide functionality such as security and key distribution, reliability control by means of forward-error-correction (FEC) techniques and associated delivery procedures such as file-repair, delivery verification. Delivery methods can include download and streaming. The MBMS user service can enable applications. A user service can include multimedia messaging service or packet-switched streaming service (PSS).

DASH-based adaptive streaming over HTTP can be different from real time streaming protocol (RTSP)-based adaptive streaming. RTSP can be a network control protocol used in entertainment and communications systems to control streaming media servers. The RTSP protocol can be used for establishing and controlling media sessions between end points in a push-based and server controlled fashion, while DASH-based adaptive streaming can be pull-based and client-controlled. Clients of media servers can issue videocassette recorder (VCR)-like commands, such as play and pause, to facilitate real-time control of playback of media files from the server. While similar in some ways to HTTP, RTSP can define control sequences useful in controlling multimedia playback. While HTTP can be stateless, RTSP can have a state or an identifier used when needed to track concurrent sessions.

Prior to the use of DASH-based adaptive streaming techniques, progressive download methods were also available for media delivery from standard HTTP web servers. Disadvantages of HTTP-based progressive download can include that bandwidth may be wasted if a user decides to stop watching the content after progressive download has started (e.g., switching to another content), the download is not really bitrate adaptive, or the download does not support live media services. DASH technology can address the weaknesses of RTP/RTSP-based streaming and HTTP-based progressive download.

In DASH, the media presentation description (MPD) metadata file can provide information on the structure and different versions of the media content representations stored in the server, including different bitrates, frame rates, resolutions, codec types, and similar information. The MPD information can be use to ensure mapping of segments into media presentation timeline for switching and synchronizing the presentation with other representations. In addition, DASH can also specify the segment formats, such as information on the initialization and media segments for a media engine. The media engine can view the initialization segment to determine a container format and media timing information.

Examples of DASH technologies can include Microsoft IIS Smooth Streaming, Apple HTTP Live Streaming, and Adobe HTTP Dynamic Streaming. DASH technology has also been standardized by organizations, such as the third generation partnership project (3GPP), moving picture experts group (MPEG), and open IPTV forum (OIPF).

To provide a consistent user experience for an entire adaptive streaming session or content delivery session. A mobile device can switch between an HTTP-based delivery and a MBMS download depending on certain circumstances, such as changing between packet-switch streaming service (PSS) and MBMS coverage, or triggered by a specific user action, such as trick play. Trick play or trick modes can include fast forward, fast rewind, slow motion, slow rewind, pause and resume. Trick play or trick modes can be based on a processing of received segments by a mobile device. The received (or downloaded) segments can be provided to the decoder at a speed lower or higher than the segment's nominal timeline (the internal timestamps) may mandate, thus producing a desired trick effect on the screen or media presentation.

A mobile device may have already established MBMS download or HTTP-based DASH-formatted content delivery session. The mobile device may be capable of switching to the other delivery method, such as an HTTP-based delivery if receiving a MBMS download, or switching to a MBMS download if receiving an HTTP-based delivery. Examples of some relevant switching events for switching from MBMS download to HTTP-based delivery method can be provided without changing a channel and with changing a channel. For example, without a channel change, a user may be viewing an MBMS user service and move out of MBMS coverage. Or the user may initiate trick play mode action facilitating a switch to an HTTP-based delivery. In another example, the content may only be available on packet switch streaming (PSS)/DASH with a change of a channel. Examples of some relevant switching events for switching from HTTP-based delivery to MBMS download can be provided without changing a channel and with changing a channel. For example, without a channel change, the user may return back from trick play mode to a normal MBMS user service. In another example, the content may only be available on MBMS with a change of a channel.

FIG. 1 illustrates an IMS based PSS and MBMS user service functional architecture. Functional blocks that can facilitate the switching between the MBMS download and HTTP-based DASH delivery can include IM CN subsystem 220, the UE 210, the SCF 230, the HTTP/SIP adapter 250, the HTTP server 260, the BMSC.UPF 240, a policy and charging rules function (PCRF) 270 module, service selection function (SSF) 290 module, and a PSS adapter 292. Another functional block IMS based PSS and MBMS user service functional architecture can be an evolved packet core (EPC)/packet-switch streaming (PS)/RAN 280. An EPC or system architecture evolution (SAE) can include a mobility management entity (MME), a serving gateway (SGW), and packet data network (PDN) gateway (PGW).

The IM CN subsystem 220 can support user registration and authentication, mobility and roaming, control of multimedia sessions, quality of service (QoS) control, policy control, charging, and/or interworking with circuit switched networks. The UE 210 can contain the generic bootstrapping architecture (GBA)/IMS/PSS/MBMS clients, which can perform service discovery and selection, handle service initiation, modification and termination, and/or receive and present the content to the user.

The SCF 230 can provide service logic and functions to support the execution of such service logic. The SCF can provide service authorization during session initiation and session modification, which can include checking the PSS and the MBMS user's service subscription in order to allow or deny access to the service. The SCF can select the relevant PSS and MBMS media functions. For HTTP-based delivery, the SCF can act as a proxy or back-to-back user agent (B2BUA). For MBMS, the SCF can act as a terminating user agent (UA). The HTTP/SIP adapter 250 can correlate a SIP session with HTTP incoming requests. The HTTP server 260 can provide the DASH formatted content for the HTTP-based delivery. The PCRF 270 module can control the charging and the establishment of resources in the RAN and PS core network 280. The SSF 290 module can provide a list of available PSS (including HTTP-based DASH) and MBMS user services and relevant user service description information. The SSF module can be personalized to the client's identity. The PSS adapter 292 can performs bi-directional protocol translation between SIP and RTSP to offer control of PSS servers. The BMSC.UPF 240 can include broadcast multicast service center (BMSC) user plane sub-functions (UPF). The BMSC.UPF can provide the DASH formatted content for the MBMS download.

Figure 2:
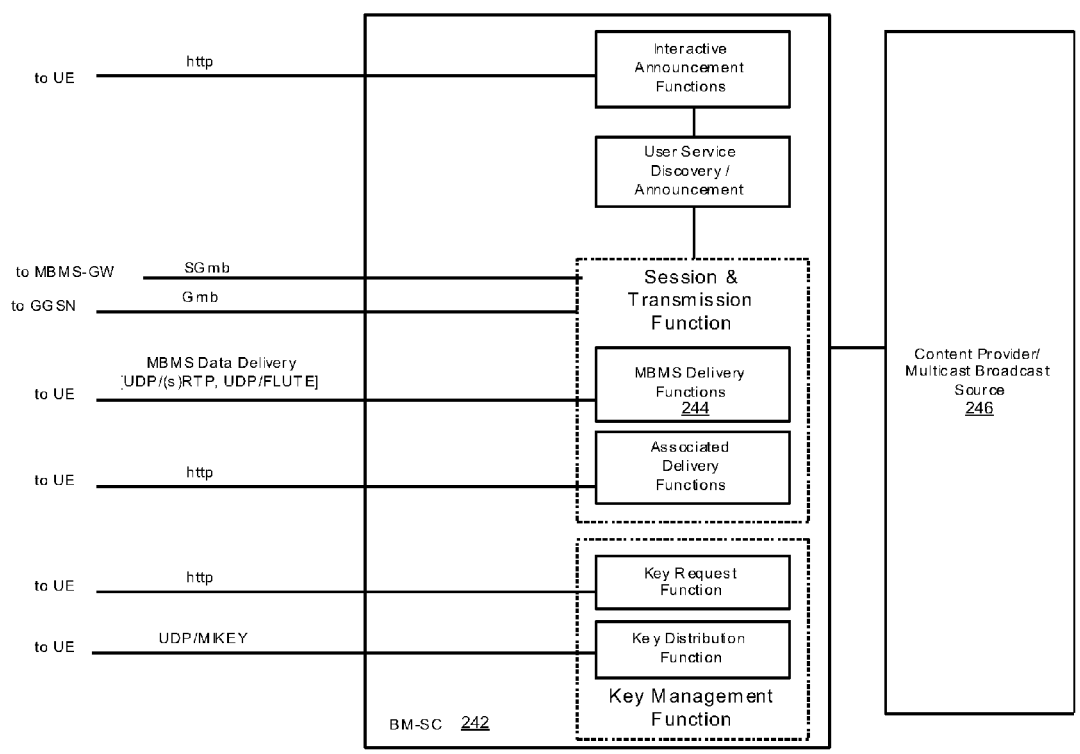
FIG. 2 illustrates a block diagram of a broadcast multicast service center (BMSC) sub-functional architecture in accordance with an example.

FIG. 2 illustrates the BMSC sub-functional architecture and associated interfaces between the UE and BMSC. The BMSC or BM-SC 242 can be in communication with and/or control a content provider/multicast broadcast source 246. The BM-SC can provide the MBMS delivery functions 244.

Figure 3:
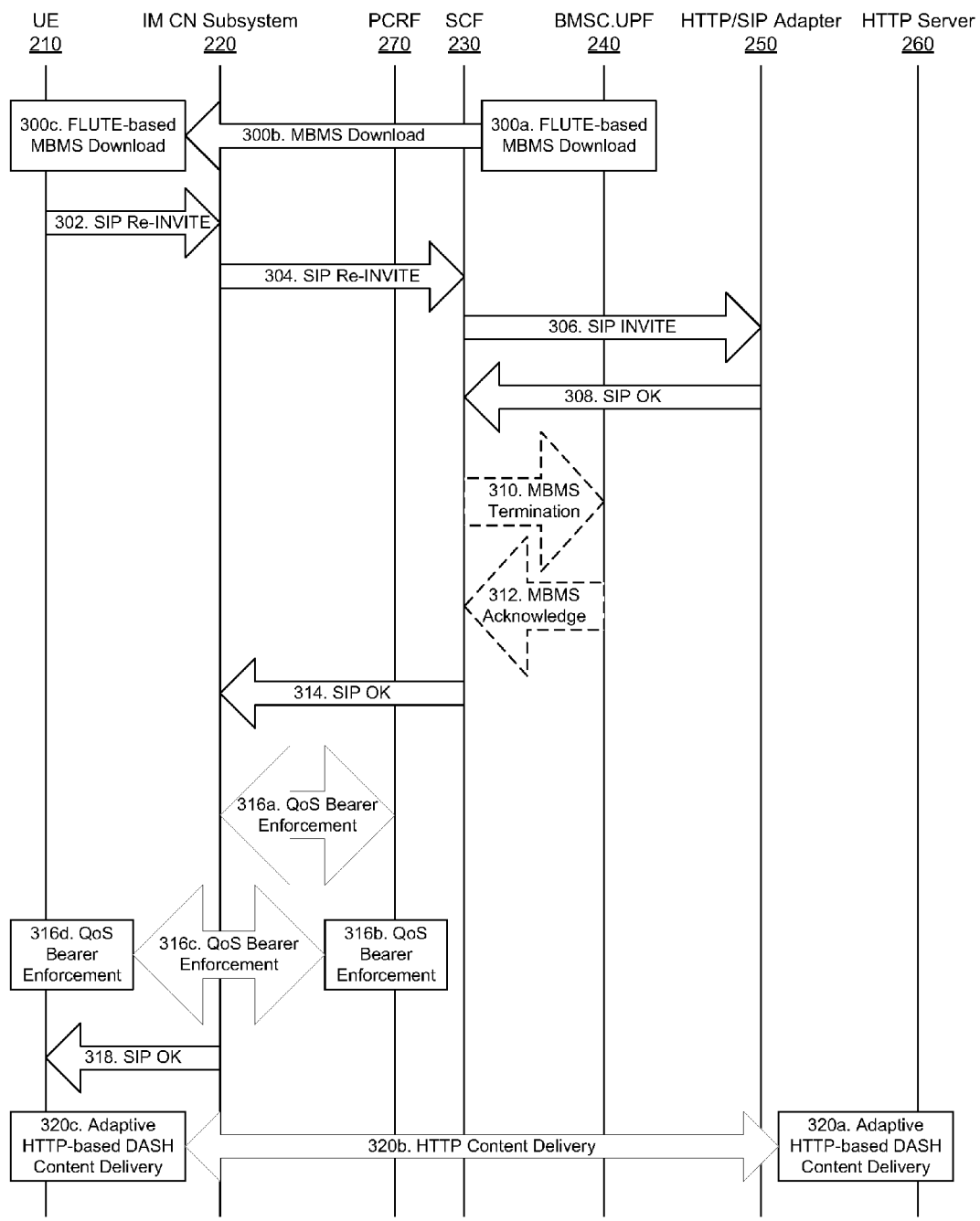
FIG. 3 depicts an example process for switching from a multimedia broadcast multicast services (MBMS) download to a hypertext transfer protocol (HTTP)-based delivery of dynamic adaptive streaming over HTTP (DASH) formatted content in an internet protocol (IP) multimedia subsystem (IMS) network in accordance with an example.

FIG. 3 illustrates an example of switching from a MBMS download to an HTTP-based delivery of DASH formatted content in an IMS-based content delivery session. A FLUTE-based MBMS download 300a-c delivery may have been previously initiated and the UE 210 may be receiving the DASH-formatted content from the BMSC.UPF 240. The MBMS download can be a mechanism used by a MBMS user service to deliver content. The MBMS download can refer to a MBMS delivery method that uses MBMS bearers in delivering content and may make use of associated procedures. The MBMS download method used herein can be applicable for both delivery of continuous media (e.g. real-time video) or delivery of discrete objects (e.g. files).

The UE 210 may start HTTP streaming by fetching media segments from the HTTP server after obtaining an MPD. In order to switch from the MBMS download to HTTP-based delivery of DASH formatted content, a session initiation protocol (SIP) Re-INVITE 302 can be issued by the UE and sent to the IM CN subsystem 220. A session description protocol (SDP) offer and a request uniform resource identifier (URI) can be included in the SIP Re-INVITE message.

The request URI can be related to the HTTP-based delivery session or a SIP session that a user wishes to activate. The request URI can be composed of a user part and domain part. The user part can contain the content identifier, retrieved from user service description information from the SSF module. The content identifier can be retrieved from service selection information. The domain part can include the service provider domain name, obtained from the SSF module. The 'To' header of a SIP Re-INVITE 302 and 304 or INVITE 306 message can contain the same URI as in the request URI. The 'From' header of a SIP Re-INVITE or INVITE message can indicate a public user identity of the user. The content identifier can be retrieved from the service selection information.

The SDP offer can include the media capabilities and policies available for the HTTP streaming session. For example, the SDP offer can carry the parameters indicating the type of the recommended service, (e.g. PSS, MBMS, or HTTP streaming service), the content identifier, and the identifier of a target UE. The SDP offer may be derived based on the analysis of the MPD as well as based on parameters received from the SSF module during the service selection procedure. The SDP offer may be derived based on parameters received during a procedure for retrieving missing parameters by a SIP OPTIONS message.

A request to the HTTP server for the MPD may not be necessary as the UE may already have fetched the MPD during the MBMS download. In an example, if the MPD has not been previously obtained, the UE may send an HTTP GET request to the HTTP server in order to download the MPD. In another example, the SDP offer may include previously negotiated media descriptions with a port set to zero and two or more additional media descriptions. For instance, the media descriptions can include a media control channel (i.e., MPD delivery channel) and a media delivery channel (i.e. delivery channel for the unicast streams over HTTP). The SDP offer can include information for the HTTP-based delivery, such as a media description, a media control channel, a media delivery channel, a MPD control channel, a delivery channel for a unicast stream over HTTP, media capabilities available at the HTTP server, policies available at the HTTP server, and a combination of this information.

In another example, the SDP offer for media delivery may be similar to a previous SDP offer done for broadcast in terms of codecs and a transport protocol. The HTTP-based delivery can run on top of TCP whereas FLUTE-based MBMS download delivery can run on top of user datagram protocol (UDP). TCP and UDP can be protocols in the transport layer. The change in the underlying protocol, such as UDP to TCP, can be indicated in the SDP. UDP is one of the members of the Internet Protocol Suite. With UDP, computer applications can send messages, referred to as datagrams, to other hosts on an IP network without requiring prior communications to set up special transmission channels or data paths.

The IM CN subsystem 220 may forward the SIP Re-INVITE 304 message to the SCF 230. When receiving the SIP modification request in the SIP Re-INVITE, the SCF can determine if the program currently broadcasted has MBMS to HTTP switching support (a MBMS-to-HTTP switching support). If MBMS to HTTP switching is not available for the UE 210, the session modification can be rejected and the original MBMS download or session (along with the previous reserved resources) may be maintained.

If MBMS to HTTP switching is available for the UE 210, the SCF 230 can act as a B2BUA. Upon reception of the SIP Re-INVITE 304 from the UE, the SCF can check or verify the user rights for the requested DASH formatted content, identify that the request is for HTTP streaming, select an HTTP/SIP adapter 250, and forward the SIP request (a SIP INVITE 306) to the HTTP/SIP adapter which can be in charge of the HTTP streaming service by changing the request URI accordingly. When receiving a 301 or 302 response from the HTTP/SIP adapter, the SCF may not forward the 301 or 302 response message to the UE. The HTTP/SIP adapter can return a 301 response if the content requested is not managed by this HTTP/SIP adapter. The HTTP/SIP adapter can return a 302 response for any other reasons, other than not managing the content request (a 301 response). For instance, a 302 response message may be sent for a reason such as load balancing.

If the request URI contains a content identifier in the user part and a domain name in the domain part, the SCF 230 can select a suitable HTTP/SIP adapter 250 and generate a SIP INVITE 306 request to the selected HTTP/SIP adapter. The 'To' header of the SIP INVITE request can contain the same content identifier as in the request URI of the SIP modification request received from the UE 210 by the SCF.

The SCF 230 can send the SIP INVITE 306 request to the HTTP/SIP adapter 250 with the SDP parameters including the media capabilities and policies available for the HTTP streaming session. The SIP INVITE request may be derived based on the analysis of the MPD. In an example, the SDP offer may include previously negotiated media descriptions with a port set to zero and two or more additional media descriptions. For example, the media descriptions can include a media control channel (i.e., MPD delivery channel) and a media delivery channel (i.e. delivery channel for the unicast streams over HTTP).

The SCF 230 can tear down the FLUTE-based MBMS download session between the BMSC.UPF 240 and the UE 210. The SCF can send a MBMS termination 310 request or message to the BMSC.UPF. The communication protocol between the SCF and the BMSC.UPF can be defined by 3GPP technical specification (TS) 26.346 V10.0.0 published March 2011. The BMSC.UPF may release any content provider/multicast broadcast source (246 of FIG. 2) and terminate the MBMS download. The BMSC.UPF can send an acknowledgement (ACK) 312 message to the SCF indicating a successful termination or send a negative acknowledgement (NACK) message to the SCF indicating a failed termination or release of resources.

Upon reception of the HTTP streaming session initiation request (e.g., SIP INVITE 306), the HTTP/SIP adapter 250 can examine the content identifier present in the user part of the 'To' header and the media parameters in the SDP and select an HTTP server 260 according to the request URI. The HTTP/SIP adapter can send an HTTP POST message to the HTTP server including the IP address of the UE. The HTTP/SIP adapter may decide to redirect the request to another HTTP/SIP adapter server. In the case of a redirect the request to another HTTP/SIP adapter server, the HTTP/SIP adapter can return a 301 response if the content is not managed by this HTTP/SIP adapter or a 302 response for any other reasons, such as load balancing. The redirecting HTTP/SIP adapter can indicate one or more destination HTTP/SIP adapter addresses in the contact header.

The HTTP/SIP adapter 250 can return an SIP acknowledgement message, such as a SIP OK 308 message (e.g., a SIP 200 OK message), to the SCF 230. The SIP acknowledgement can include a SDP answer. The SDP answer can describe the HTTP streaming session (or the SIP session). The SDP answer can include information for the HTTP-based delivery, such as a media description, a media control channel, a media delivery channel, a media presentation description (MPD) control channel, a delivery description, and a combination of this information.

The SCF 230 can forward the SIP OK 314 to the IM CN subsystem 220. The IM CN subsystem can interact with the policy charging and rules function (PCRF) 270 module of the policy charging and control (PCC) architecture to commit the QoS reservation for QoS bearer enforcement 316a. The PCRF module can provide QoS bearer enforcement 316b-d between the UE and the IMS. The IM CN subsystem can then forward the SIP OK 318 (e.g., a SIP 200 OK message) to the UE 210.

The proxy call session control function (P-CSCF) can be used as the application function in the PCC architecture. The PCRF 270 can decide how policy control of the QoS is performed for an IMS initiated and controlled PSS and MBMS user service. The PCRF can use the SDP received from the P-CSCF during session establishment to calculate a proper QoS authorization. The appropriate existing bearers can be used or new required bearers can be allocated by the PCRF. Network initiated bearer control and UE initiated bearer control may be possible. When receiving a final SDP, the UE 210 may initiate the establishment of the required bearers unless a network initiated bearer allocation procedure is already ongoing. Alternatively, the UE has been configured to use network initiated resource control.

After receiving the SIP OK 318, the UE 210 can leave the multicast channel and can start downloading DASH-formatted content over HTTP (adaptive HTTP-based DASH content delivery 320a-c), such that the media segments can be delivered to the UE using the reserved QoS.

In another example, an air interface between a mobile device, such as a UE, and a transmission station, such as an eNB, may support unicast and multicast delivery of content to allow the switching between the MBMS download and the HTTP-based delivery of DASH formatted content. The eNB of the RAN can be in communication with the IMS and modules within the IMS, such as the SCF module. The air interface can include the 3GPP LTE or the 802.16 standard. The mobile device and/or the transmission station can use the 3GPP LTE or the 802.16 protocol. The 3GPP LTE standard can include LTE Rel-8 (2008), LTE Rel-9 (2009), and LTE Rel-10 (2011). The IEEE 802.16 standard can include IEEE 802.16e-2005, IEEE 802.16k-2007, IEEE 802.16-2009, IEEE 802.16j-2009, IEEE 802.16h-2010, and IEEE 802.16m-2011.

Figure 4:
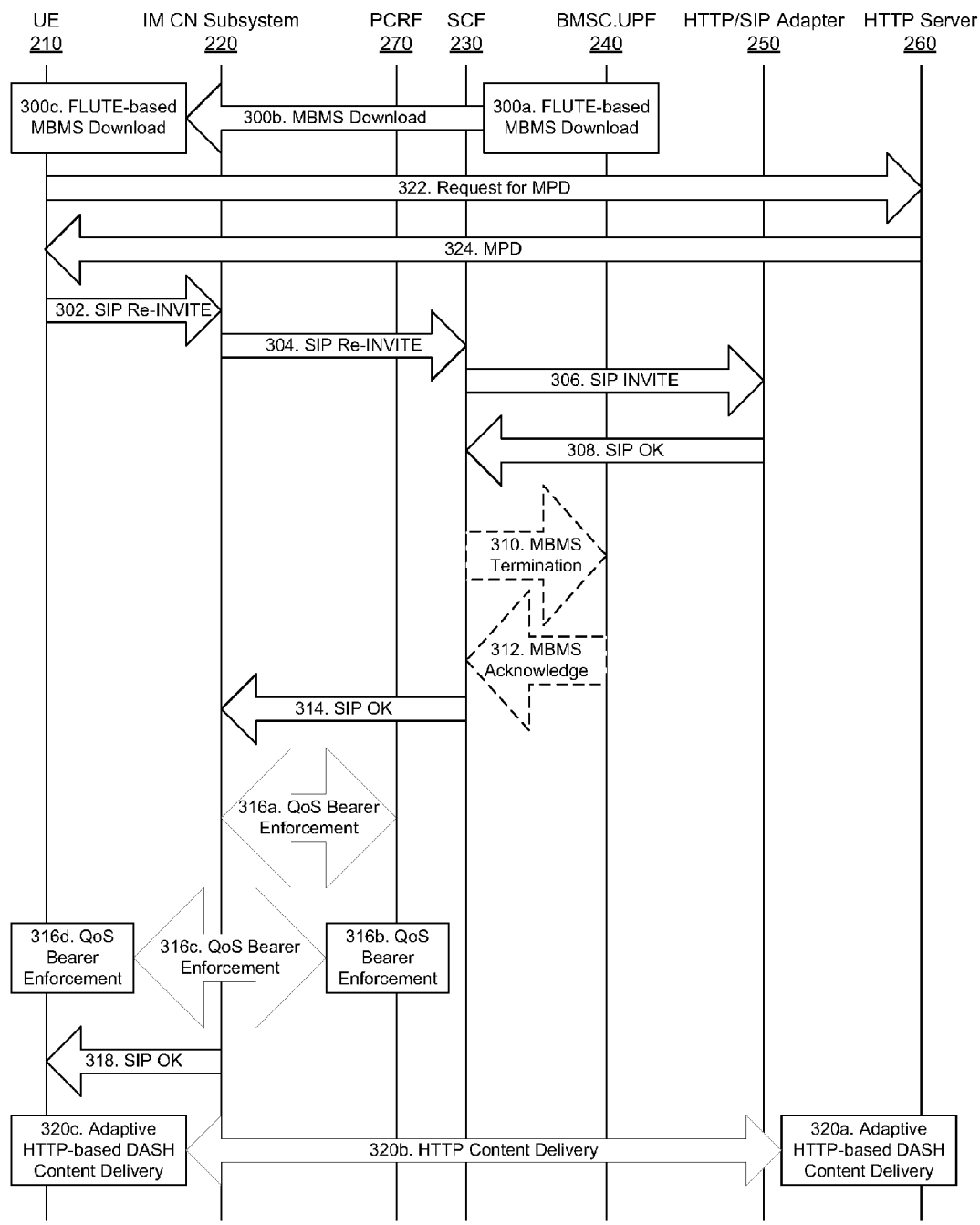
FIG. 4 depicts an example process for switching from a multimedia broadcast multicast services (MBMS) download to a hypertext transfer protocol (HTTP)-based delivery of dynamic adaptive streaming over HTTP (DASH) formatted content in an internet protocol (IP) multimedia subsystem (IMS) network including a request for a media presentation description (MPD) in accordance with an example.

FIG. 4 illustrates an example of switching from a MBMS download to an HTTP-based delivery of DASH formatted content in a content delivery session, where a MPD metadata file is obtained prior to a SIP Re-INVITE. The UE 210 can make a request for the MPD 322 from the HTTP server 260.

The HTTP server can send the MPD 324 to the UE. The UE can use the information in the MPD to generate the SIP Re-INVITE 302 to be sent to the IM CN subsystem 220. The rest of the operations in FIG. 4 can be similar to the operations of FIG. 3, which were previously discussed.

Figure 5:
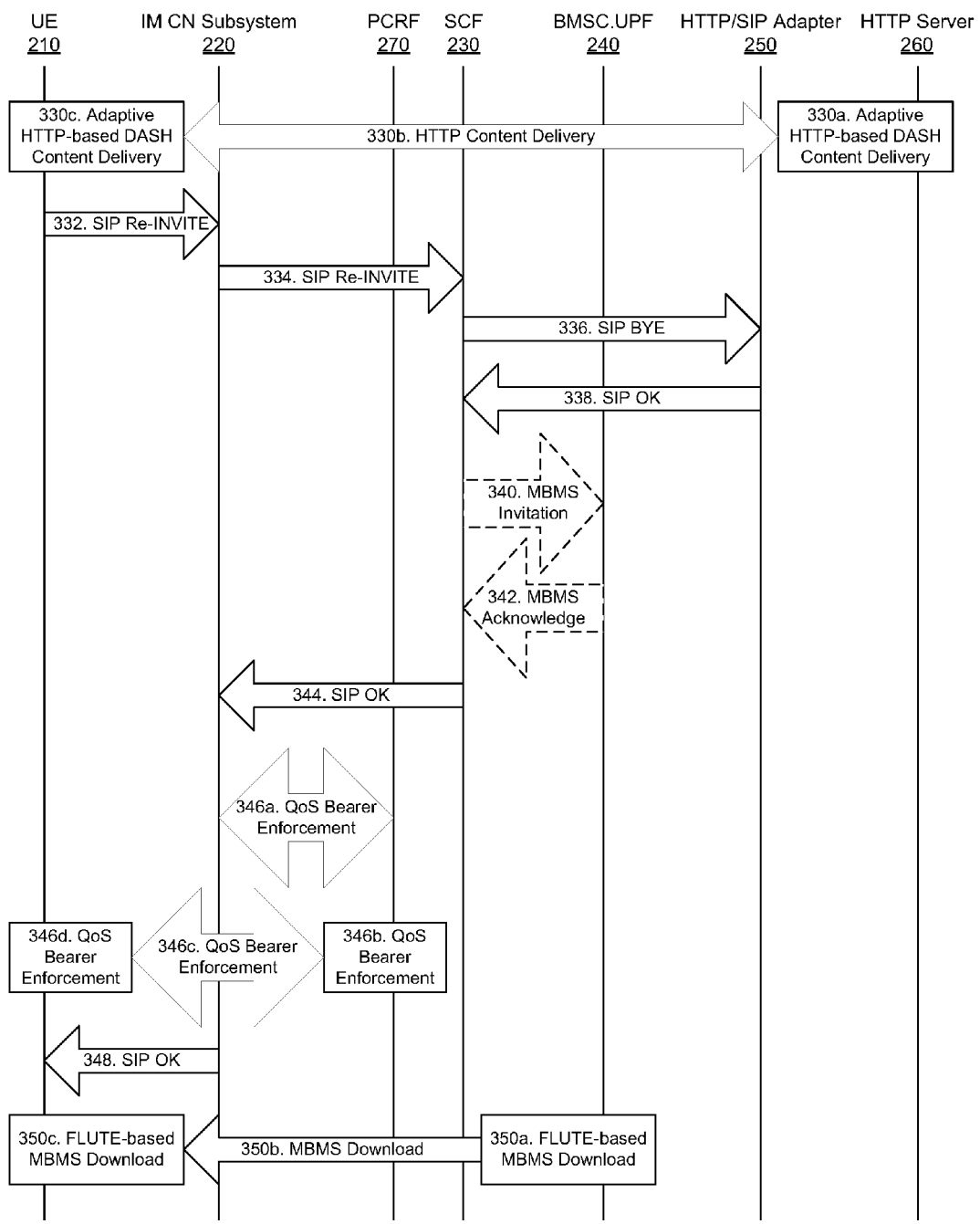
FIG. 5 depicts an example process for switching from a hypertext transfer protocol (HTTP)-based delivery to a multimedia broadcast multicast services (MBMS) download delivery of DASH formatted content in an internet protocol (IP) multimedia subsystem (IMS) network in accordance with an example.

FIG. 5 illustrates an example of switching from HTTP-based delivery to MBMS download of DASH formatted content in a content delivery session. An HTTP-based delivery (e.g., adaptive HTTP-based DASH content delivery 330a-c) may have been previously initiated and the UE 210 may be receiving the DASH-formatted content over HTTP from the HTTP server 260. The DASH formatted content may be delivered in an existing SIP session.

In order to switch from HTTP-based delivery to MBMS download reception of DASH formatted content, a session modification request, such as SIP Re-INVITE 332, can be issued by the UE 210 and sent to the IM CN subsystem 220. A session description protocol (SDP) offer indicating the chosen MBMS download service and FLUTE session information and a request uniform resource identifier (URI) can be included in the SIP Re-INVITE message. The SDP offer can be performed in accordance with the parameters received during a UE service selection procedure and with media capabilities and required bandwidth available for the MBMS download service. In an example, the SDP offer for media delivery may be similar to the previous SDP offer performed for HTTP-based delivery in terms of codecs and transport protocol. The SDP offer can include information for the MBMS download, such as a media description, a media control channel, a media delivery channel, a MPD control channel, a delivery channel for a multicast stream over MBMS, media capabilities available at the BMSC, policies available at the BMSC, and a combination of this information.

In another example, the MPD may include information to switch from HTTP-based delivery to MBMS download delivery and the UE may utilize such information when issuing the session modification request, e.g., SIP Re-INVITE, to switch to the MBMS download. The SIP Re-INVITE message can also contain the request URI which can include the public service identifier (PSI) of a MBMS download service. The 'To' header of the SIP Re-INVITE can contain the same URI as in the request URI and the 'From' header of the SIP Re-INVITE can indicate the public user identity of the user.

The IM CN subsystem 220 can forward the SIP Re-INVITE 334 message to the SCF 230. Upon receipt of SIP Re-INVITE request, the SCF can perform service authorization procedures to check the service rights of requested MBMS download service according to the user subscription information.

When receiving the SIP modification request (e.g., SIP Re-INVITE), the SCF 230 can determine if the content currently delivered has HTTP to MBMS switching support (e.g., an HTTP-to-MBMS switching support). If HTTP to MBMS switching is not available for the UE 210, the session modification can be rejected and the original HTTP session (along with the previous reserved resources) may be maintained. If HTTP to MBMS switching is available for the UE, the SCF can act as a B2BUA to establish the FLUTE-based MBMS download session between the BMSC.UPF and UE. The communication protocol between the SCF and the BMSC.UPF can be defined by 3GPP technical specification (TS) 26.346 V10.0.0 published March 2011. The SCF can send a MBMS invitation 340 to the BMSC.UPF. When the BMSC.UPF is setup for the MBMS download, the BMSC.UPF can send a MBMS acknowledgement 342 message to the SCF. If HTTP to MBMS switching is available for the UE, the SCF can send a SIP BYE 336 message (an HTTP termination request) to the HTTP/SIP adapter 250 to terminate the SIP session between the SCF and the HTTP/SIP adapter.

The HTTP/SIP adapter 250 can then release the HTTP server 260, and can send a SIP acknowledgement message, such as a SIP OK 338 message, to the SCF 230. Once receiving a SIP OK message from HTTP adapter, the SCF can send a SIP OK 344 message to IM CN subsystem 220. The SIP acknowledgement can include a SDP answer. The SDP answer can include information for the MBMS download, such as a media description, a media control channel, a media delivery channel, a media presentation description (MPD) control channel, a delivery description, and a combination of this information.

The IM CN subsystem 220 can forward the SIP OK 348 message to the UE 210. The SIP OK message can include the SDP answer. The P-CSCF can be used as the application function in the PCC architecture. The PCRF can decide how policy control of the QoS is performed for the IMS initiated and controlled MBMS user service and communication for QoS bearer enforcement 346a-d (similar to the process for QoS bearer enforcement 316a-d illustrated in FIG. 3 between the IM CN subsystem, the PCRF module, and the UE). For a switch to the MBMS download, the PCRF may not initiate the establishment of a specific bearer.

Once the UE 210 receives the SIP OK response, the UE can activate a corresponding MBMS user service as described in the SDP, such as the MBMS download service based on FLUTE 350a-c. The MBMS download reception initiation may correspond to the MBMS broadcast mode activation procedure or the MBMS multicast mode activation procedure. The UE can examine the FLUTE session parameters in the received SDP, and receive the MBMS download data accordingly. In the case where a file delivery table (FDT) may be unavailable, the UE can get the FDT according to an fdt_address attribute in the SDP answer. The FDT can contain content description information for the files delivered in the FLUTE session. In the case of an incomplete download, the UE can execute the file repair procedures towards the repair server indicated by a repair-server-address attribute in the SDP answer.

The switching between the MBMS download and the HTTP-based delivery can be agnostic of specific air interface (e.g., RAN) characteristics. Any air interface or combination of multiple air interfaces may be applicable as long as associated networks can host the IMS-based HTTP delivery and MBMS download delivery functions. The switching between the MBMS download and the HTTP-based delivery can be used in 3GPP-based or 802.16-based wireless wide area networks (WWANs), and IMS-based applications, where optimized delivery of DASH-formatted multimedia content over these networks is desired. The signaling procedures for enabling the switching between HTTP-based delivery and MBMS download delivery for streaming DASH formatted content can improve the quality of experience for the user.

Figure 6:
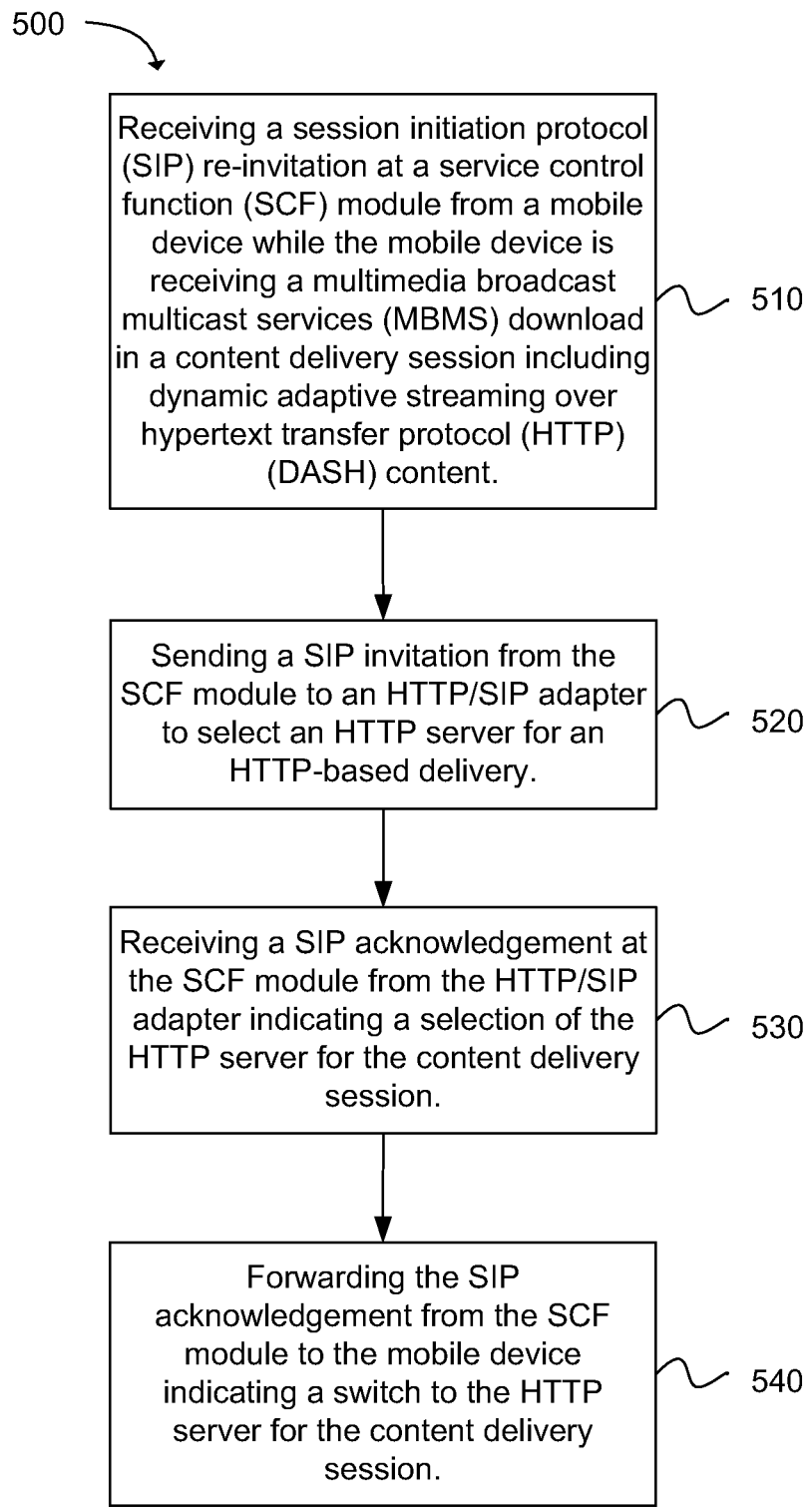
FIG. 6 depicts a flow chart of a method for switching from a multimedia broadcast multicast services (MBMS) download to a hypertext transfer protocol (HTTP)-based delivery of dynamic adaptive streaming over HTTP (DASH) formatted content in an internet protocol (IP) multimedia subsystem (IMS) network in accordance with an example.

Another example provides a method 500 for switching from a multimedia broadcast multicast services (MBMS) download to a hypertext transfer protocol (HTTP)-based delivery of dynamic adaptive streaming over HTTP (DASH) formatted content, as shown in the flow chart in FIG. 6. The method includes the operation of receiving a session initiation protocol (SIP) re-invitation at a service control function (SCF) module from a mobile device while the mobile device is receiving a MBMS download in a content delivery session including DASH formatted content, as in block 510. The operation of sending a SIP invitation from the SCF module to an HTTP/SIP adapter to select an HTTP server for an HTTP-based delivery follows, as in block 520. The next operation of the method can be receiving a SIP acknowledgement at the SCF module from the HTTP/SIP adapter indicating a selection of the HTTP server for the content delivery session, as in block 530. The method can further include forwarding the SIP acknowledgement from the SCF module to the mobile device indicating a switch to the HTTP server for the content delivery session, as in block 540.

Figure 7:
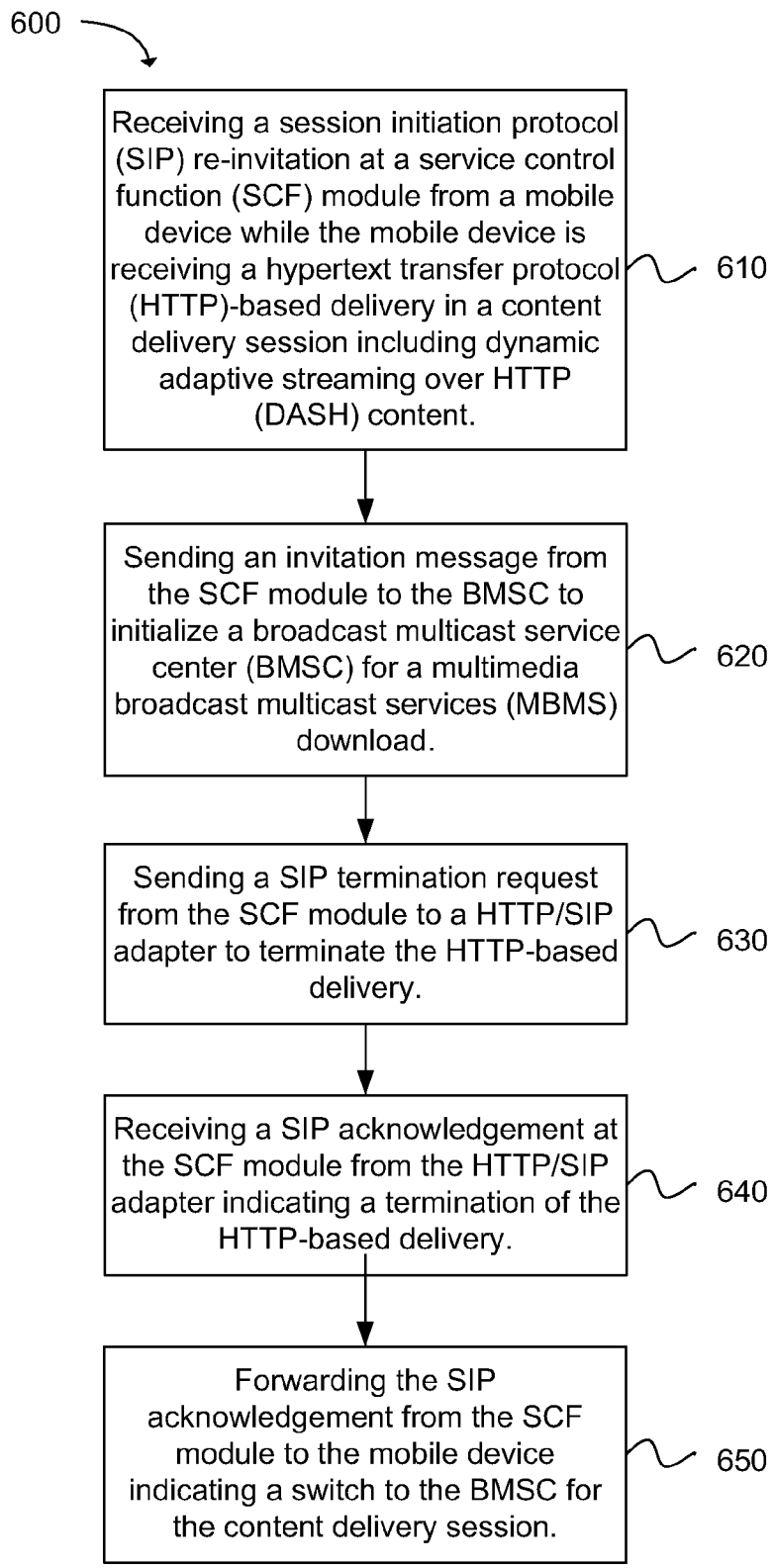
FIG. 7 depicts a flow chart of a method for switching from a hypertext transfer protocol (HTTP)-based delivery to a multimedia broadcast multicast services (MBMS) download delivery of DASH formatted content in an internet protocol (IP) multimedia subsystem (IMS) network in accordance with an example.

Another example provides a method 600 for switching from a hypertext transfer protocol (HTTP)-based delivery of dynamic adaptive streaming over HTTP (DASH) formatted content to a multimedia broadcast multicast services (MBMS) download, as shown in the flow chart in FIG. 7. The method includes the operation of receiving a session initiation protocol (SIP) re-invitation at a service control function (SCF) module from a mobile device while the mobile device is receiving an HTTP-based delivery in a content delivery session including DASH formatted content, as in block 610. The operation of sending an invitation message from the SCF module to the BMSC to initialize a broadcast multicast service center (BMSC) for a MBMS download follows, as in block 620. The next operation of the method can be sending a SIP termination request from the SCF module to an HTTP/SIP adapter to terminate the HTTP-based delivery, as in block 630. The operation of receiving a SIP acknowledgement at the SCF module from the HTTP/SIP adapter indicating a termination of the HTTP-based delivery follows, as in block 640. The method can further include forwarding the SIP acknowledgement from the SCF module to the mobile device indicating a switch to the BMSC for the content delivery session, as in block 650.

In another example, the SCF can include a transceiver module configured to receive a multicast-to-unicast session modification request, where the transceiver can perform the operations related to the SCF illustrated in FIG. 3. The transceiver module of the SCF can be configured to receive a unicast-to-multicast session modification request, where the transceiver can perform the operations related to the SCF illustrated in FIG. 5.

In another example, the mobile device can include a transceiver configured to send a multicast-to-unicast session modification request to an IM CN subsystem, where the transceiver can perform the operations related to the mobile device illustrated in FIG. 3. The transceiver module of the SCF can be configured to send a unicast-to-multicast session modification request, where the transceiver can perform the operations related to the mobile device illustrated in FIG. 5. The transceiver can be configured to receive a SIP acknowledgement or SIP termination message from the IM CN subsystem. The mobile device can include a processing module configured to switch between the MBMS download and the HTTP-based delivery for the DASH formatted content.

Figure 8:
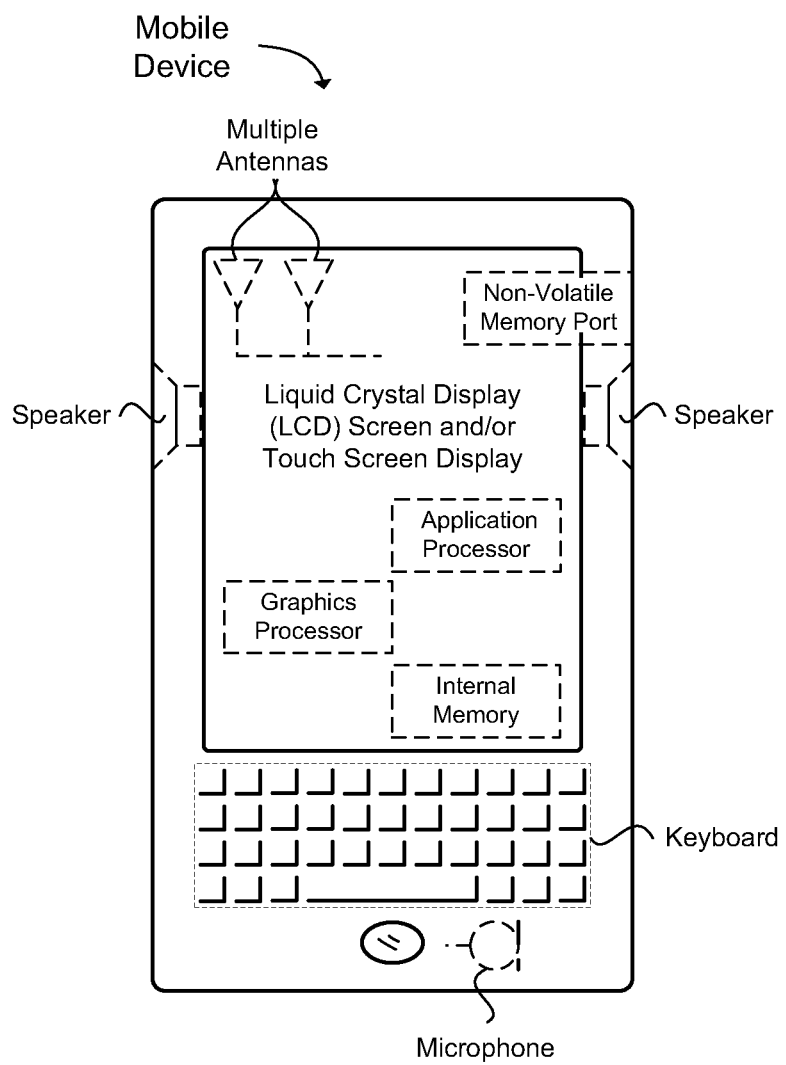
FIG. 8 illustrates a diagram of a user equipment (UE) in accordance with an example.

In another example, a transmission station can be in wireless communication with a mobile device. FIG. 8 provides an example illustration of the mobile device, such as a user equipment (UE), a mobile station (MS), a mobile wireless device, a mobile communication device, a tablet, a handset, or other type of mobile wireless device. The mobile device can include one or more antennas configured to communicate with a node, macro node, low power node (LPN), or, transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 8 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A non-transitory machine readable storage medium having instructions tangibly embodied thereon for switching from a packet-switched streaming service (PSS) download to a multimedia broadcast multicast services (MBMS) download, the instructions being executed by one or more processors to perform the following:
   receiving a session initiation protocol (SIP) re-invitation at a service control function (SCF) module from a user equipment (UE), the SIP re-invitation including the MBMS download that is chosen by the UE;
   sending a SIP BYE message from the SCF module to a hypertext transfer protocol (HTTP)/SIP adapter in order to terminate the PSS download at the UE, the PSS download comprising dynamic adaptive streaming over hypertext transfer protocol (HTTP) (DASH) content, wherein user rights for the MBMS download are verified at the SCF module before sending the SIP BYE message to terminate the PSS download from the SCF module to the HTTP/SIP adapter;
   receiving a SIP acknowledgement at the SCF module from the HTTP/SIP adapter indicating that an HTTP server has terminated the PSS download for the UE; and
   forwarding the SIP acknowledgement from the SCF module to the UE, the SIP acknowledgement causing the UE to initiate the MBMS download, the MBMS download comprising DASH content, thereby causing the UE to switch from the PSS download of DASH content to the MBMS download of DASH content.

2. The non-transitory machine readable storage medium of claim 1, wherein the SIP re-invitation is received at the SCF module from the UE via an internet protocol (IP) multimedia subsystem (IMS) core network (IM CN) subsystem.

3. The non-transitory machine readable storage medium of claim 1, wherein the SIP acknowledgement is forwarded from the SCF module to the UE via an internet protocol (IP) multimedia subsystem (IMS) core network (IM CN) subsystem.

4. The non-transitory machine readable storage medium of claim 1, wherein the SIP acknowledgement includes a session description protocol (SDP) answer that, when received at the UE, initiates the MBMS download at the UE.

5. The non-transitory machine readable storage medium of claim 1, wherein the SIP re-invitation includes a session description protocol (SDP) offer that includes information that describes the MBMS download.

6. The non-transitory machine readable storage medium of claim 1, wherein the SIP re-invitation includes a SIP Re-INVITE message.

7. The non-transitory machine readable storage medium of claim 1, wherein the SIP acknowledgement includes a SIP 200 OK message.

8. The non-transitory machine readable storage medium of claim 1, wherein the MBMS download operates using a file delivery over unidirectional transport (FLUTE) protocol, and the PSS download operates using hypertext transfer protocol (HTTP).

9. The non-transitory machine readable storage medium of claim 1, wherein the SCF module is included in an internet protocol (IP) multimedia subsystem (IMS).

10. A service control function (SCF) in an internet protocol (IP) multimedia subsystem (IMS), the SCF comprising one or more processors and memory configured to:
    receive a session initiation protocol (SIP) re-invitation at a service control function (SCF) module from a user equipment (UE), the SIP re-invitation including a multimedia broadcast multicast services (MBMS) download that is chosen by the UE;

send a SIP BYE message from the SCF module to a hypertext transfer protocol (HTTP)/SIP adapter in order to terminate a packet-switched streaming service (PSS) download at the UE, the PSS download comprising dynamic adaptive streaming over hypertext transfer protocol (HTTP) (DASH) content, wherein user rights for the MBMS download are verified at the SCF module before sending the SIP BYE message to terminate the PSS download from the SCF module to the HTTP/SIP adapter;

receive a SIP acknowledgement at the SCF module from the HTTP/SIP adapter indicating that an HTTP server has terminated the PSS download for the UE; and forward the SIP acknowledgement from the SCF module to the UE, the SIP acknowledgement causing the UE to initiate the MBMS download, the MBMS download comprising DASH content, thereby causing the UE to switch from the PSS download of DASH content to the MBMS download of DASH content.

11. The SCF of claim 10, wherein the MBMS download operates using a file delivery over unidirectional transport (FLUTE) protocol, and the PSS download operates using hypertext transfer protocol (HTTP).

12. A user equipment (UE) operable to switch between a packet-switched streaming service (PSS) download session and a multimedia broadcast multicast services (MBMS) download session, the UE having one or more processors and memory configured to:

send a session initiation protocol (SIP) re-invitation to a service control function (SCF) module during the PSS download session, wherein the SIP re-invitation includes a request uniform resource identifier (URI) for an MBMS download servicosession, wherein the SCF module is configured to send a SIP BYE message to a hypertext transfer protocol (HTTP)/SIP adapter in order to terminate the PSS download session at the UE, wherein user rights for the MBMS download session are verified at the SCF module before the SIP BYE message to terminate the PSS download session is sent from the SCF module to the HTTP/SIP adapter, and the PSS download session includes downloading dynamic adaptive streaming over hypertext transfer protocol (HTTP) (DASH) content;

receive a SIP acknowledgement from the SCF module, wherein the SCF module is configured to receive the SIP acknowledgement from the HTTP/SIP adapter indicating that an HTTP server has terminated the PSS download session for the UE; and switch from the PSS download session to the MBMS download session at the UE in response to the SIP acknowledgement being received at the UE, wherein the MBMS download session includes downloading DASH content, thereby causing the UE to switch from the PSS download session of DASH content to the MBMS download session of DASH content.

13. The UE of claim 12, wherein the one or more processors and memory are further configured to:

send the SIP re-invitation to the SCF module via an internet protocol (IP) multimedia subsystem (IMS) core network (IM CN) subsystem; and receive the SIP acknowledgement from the SCF module via the IM CN subsystem.

14. The UE of claim 12, wherein:

the SIP re-invitation includes a session description protocol (SDP) offer that includes information that describes the MBMS download session; and the SIP acknowledgement includes a session description protocol (SDP) answer that, when received at the UE, initiates the MBMS download session at the UE.

15. The UE of claim 12, wherein the SIP re-invitation includes a SIP Re-INVITE message and the SIP acknowledgement includes a SIP 200 OK message.

16. The UE of claim 12, wherein the MBMS download session operates using a file delivery over unidirectional transport (FLUTE) protocol, and the PSS download session operates using hypertext transfer protocol (HTTP).

* * * * *